(12) United States Patent
Schneider, Jr. et al.

(10) Patent No.: US 11,137,509 B2
(45) Date of Patent: Oct. 5, 2021

(54) SEISMIC IMAGING WITH A TEMPORAL DECOMPOSITION IMAGING CONDITION

(71) Applicant: Fairfield Industries, Inc., Sugar Land, TX (US)

(72) Inventors: William Aeppli Schneider, Jr., Sugar Land, TX (US); Paul Docherty, Richmond, TX (US); Araz Mahdad, Sugar Land, TX (US)

(73) Assignee: FAIRFIELD INDUSTRIES, INC., Sugar Land, TX (US)

( * ) Notice: Subject to any disclaimer, the term of this patent is extended or adjusted under 35 U.S.C. 154(b) by 379 days.

(21) Appl. No.: 16/265,935

(22) Filed: Feb. 1, 2019

(65) Prior Publication Data

US 2019/0243018 A1  Aug. 8, 2019

Related U.S. Application Data

(60) Provisional application No. 62/625,684, filed on Feb. 2, 2018.

(51) Int. Cl.
*G01V 1/30* (2006.01)
*G01V 1/36* (2006.01)
*G01V 1/28* (2006.01)

(52) U.S. Cl.
CPC .............. *G01V 1/308* (2013.01); *G01V 1/282* (2013.01); *G01V 1/364* (2013.01); *G01V 1/366* (2013.01); *G01V 2210/3246* (2013.01); *G01V 2210/51* (2013.01)

(58) Field of Classification Search
CPC ........ G01V 1/282; G01V 1/364; G01V 1/308; G01V 1/366; G01V 2210/324; G01V 2210/3246; G01V 2210/51
See application file for complete search history.

(56) References Cited

U.S. PATENT DOCUMENTS

| 7,480,206 | B2* | 1/2009 | Hill ........................ | G01V 1/282 367/73 |
| 10,310,133 | B2* | 6/2019 | Craft ...................... | G01V 1/181 |
| 2015/0057938 | A1* | 2/2015 | Krohn .................... | G01V 1/005 702/18 |
| 2016/0209534 | A1 | 7/2016 | Behura | |
| 2016/0291177 | A1 | 10/2016 | Albertin et al. | |

(Continued)

OTHER PUBLICATIONS

International Search Report and Written Opinion of the International Searching Authority for PCT/US2019/016431 dated May 27, 2019 (14 pages).

(Continued)

*Primary Examiner* — Elias Desta
(74) *Attorney, Agent, or Firm* — Foley & Lardner LLP

(57) ABSTRACT

Systems and methods of performing a seismic survey are described. The system can receive seismic data. The system receives seismic data from one or more seismic data sources. The system propagates the seismic data forward in time through a subsurface model to generate a first wavefield. The system propagates the seismic data backward in time through the subsurface model to generate a second wavefield. The system combines the first wavefield with the second wavefield using a time gate imaging condition to produce subsurface images and image gathers.

18 Claims, 8 Drawing Sheets

(56) References Cited

U.S. PATENT DOCUMENTS

2017/0371050 A1 12/2017 Sun et al.

OTHER PUBLICATIONS

Yoon et al., "Reverse-time migration using the Poynting vector", Exploration Geophysics, vol. 37, 2006, pp. 102-107 (6 pages).
Zhao et al., "A new virtual source redatuming procedure to improve land 4D repeatability", SEG New Orleans Annual Meeting, 2015, pp. 5399-5403 (5 pages).
International Preliminary Report on Patentability for PCT/US2019/016431 dated Aug. 13, 2020 (7 pages).
Biondi, B., and Tisserant, T., 2004, 3D angle-domain common-image gathers for migration velocity analysis: Geoph. Prosp., 52, p. 575-591.
Claerbout, J.F., 1985, Fundamentals of Geophysical Data Processing: Blackwell Sci. Publ., p. 230-234.
Dickens, T.A. and Winbow, G.A., 2011, RTM angle gathers from Poynting vectors: SEG Annual Mtg in San Antonio TX, Expanded Abstracts, p. 3109-3113.
Macesanu, C., Higginbotham, J.H., Brown, M.P., 2010, Angle decomposition for one-way wave equation migration: SEG Annual Mtg in Denver CO, Expanded Abstracts, p. 3242-3246.
Whitmore, N.D., Crawley, S., Zhu, C., Sosa, A., 2014, Dynamic angle and azimuth decomposition of RTM images: SEG Annual Mtg in Denver CO, Expanded Abstracts, p. 3801-3805.
Yoon, K., Guo, M., Cai, J., Wang, B., 2011, 3D RTM angle gathers from source wave propagation direction and dip of reflector: SEG Annual Mtg. in San Antonio TX, Expanded Abstracts, p. 3136-3140.

\* cited by examiner

SEISMIC IMAGING WITH A TEMPORAL DECOMPOSITION IMAGING CONDITION

CROSS-REFERENCES TO RELATED APPLICATIONS

This application claims the benefit of and priority under 35 U.S.C. § 119 to U.S. Provisional Patent Application 62/625,684, filed Feb. 2, 2018, which is hereby incorporated by reference herein in its entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

The present disclosure is directed to systems and methods of seismic imaging with a temporal decomposition imaging condition. Due to the large volume of seismic data, it can be computationally challenging to process the seismic data to generate high quality images without excessive noise. The noise can result in artifacts in the image, which can make it challenging to analyze or interpret the image, or lead to erroneous image interpretations or false positive determinations. Systems and methods of the present solution are directed to a data processing system with an image processor configured with a time gating condition that allows for the efficient creation of angle gathers during migration of primary or multiple reflections. The improved image processor with the time gating condition can provide for significant computational speedups. For example, the improved image processor of the present solution can utilize as little as 1% of the computational recourses compared to previous approaches that map each time sample of the image separately to the angle domain.

At least one aspect is directed to a system to perform seismic imaging. The system can include a data processing system having at least one processor and memory. The data processing system can include, execute, or interface with an image processor. The image processor can include, execute or interface with a propagation component, gating component, wavefield combination component or image generator component. The data processing system can receive seismic data from one or more seismic data sources. The seismic data can include ensembles of common-source or common-receiver data. The data processing system can propagate the seismic data forward in time through a subsurface model to generate a first wavefield. The data processing system can propagate the seismic data backward in time through the subsurface model to generate a second wavefield. The data processing system can combine the first wavefield with the second wavefield using a time gate imaging condition to produce subsurface images and image gathers.

The time gate imaging condition can include a temporal window function for each of a plurality of time gates. The plurality of time gates can each have a predetermined length. The temporal window function can include at least one of a boxcar, Gaussian, cosine-squared or trapezoidal function. The time gate imaging condition can be configured to smooth across a plurality of time gates. The data processing system can generate a 4-dimensional image from the combination of the first wavefield with the second wavefield using the time gate imaging condition.

At least one aspect is directed to a method of seismic imaging. The method can be performed by one or more component of the data processing system. The method can include the data processing system receiving seismic data from one or more seismic data sources. The seismic data can include ensembles of common-source or common-receiver data. The method can include the data processing system propagating the seismic data forward in time through a subsurface model to generate a first wavefield. The method can include the data processing system propagating the seismic data backward in time through the subsurface model to generate a second wavefield. The method can include the data processing system combining the first wavefield with the second wavefield using a time gate imaging condition to produce subsurface images and image gathers.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
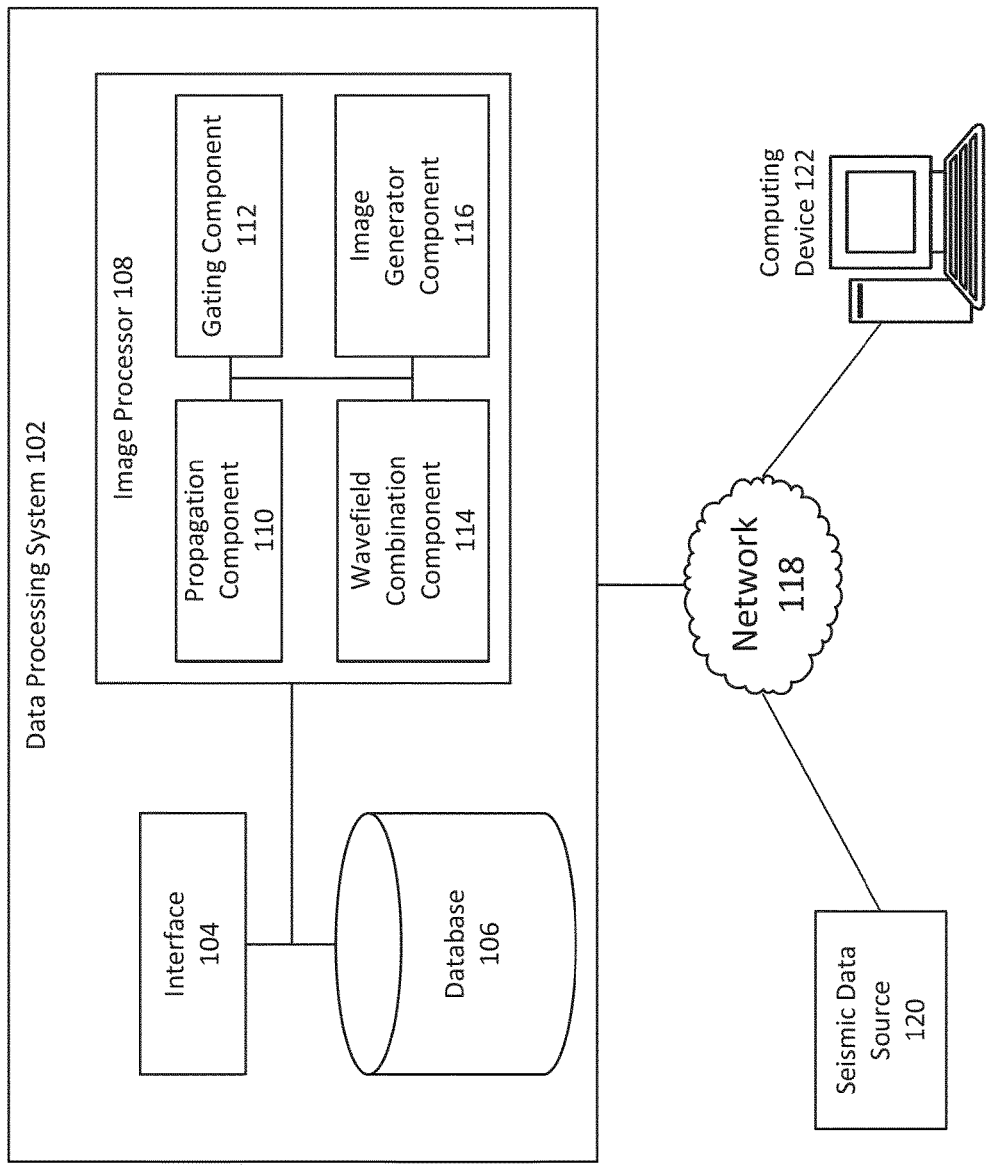
FIG. 1 depicts a system to perform seismic imaging, in accordance with an implementation.

The present disclosure is directed to systems and methods of seismic imaging with a temporal decomposition imaging condition. Due to the large volume of seismic data, it can be computationally challenging to process the seismic data to generate high quality images without excessive noise. Systems and methods of the present solution are directed to a data processing system with an image processor configured with a time gating condition that allows for the efficient creation of angle gathers during migration of primary or multiple reflection. The improved image processor with the time gating condition can provide for significant computational speedups. For example, the improved image processor of the present solution can utilize as little as 1% of the computational recourses compared to previous approaches that map each time sample of the image separately to the angle domain.

Shot-profile migration and reverse-time migration (RTM) can refer to methods for imaging prestack seismic data to produce 3-D subsurface images. Shot-profile migration and reverse-time migration operate on common-source or common-receiver data ensembles and propagates two wavefields through a subsurface model: one forward in time and the other backward in time. The forward in time wavefield can be referred to as a downgoing wavefield or "D" wavefield. The backward in time wavefield can be referred to as an upgoing wavefield or "U" wavefield. The data processing system can combine the two wavefields with an imaging condition (IC) in order to produce subsurface images and image gathers. The seismic images and gathers have many uses, including subsurface geological interpretation and iterative seismic velocity model development.

Shot-profile migration can use the "correlation" IC, which can be applied in the temporal frequency domain. RTM can use the "zero-lag of the crosscorrelation" IC, which can be the time domain equivalent of the correlation IC. These two imaging conditions are Fourier transform pairs. Kirchhoff migration can refer to an imaging technique that uses an imaging condition that selects and sums all possible arrivals that could have reflected from an image point. These arrivals can be determined by travel times consistent with the velocity model. The imaging condition can be based on the existence of reflectors in the earth at places where the onset of the downgoing wave is time coincident with an upcoming wave.

Systems and methods of the present solution can provide a data processing system with an image processor that is configured with a time gate imaging condition. For example, the correlation IC can be $$I(x,y,z) = \Sigma_\omega D^*(x,y,z;\omega) U(x,y,z;\omega), \quad \text{(Equation 1)}$$

where I is the image, ω is temporal frequency, and the * represents complex conjugation. This can be used in shot profile migration. The time-domain equivalent can be the zero lag of the crosscorrelation IC $$I(x,y,z) = \Sigma_t D(x,y,z;t) U(x,y,z;t), \quad \text{(Equation 2)}$$

where t is time. This IC can be used in RTM.

The temporal decomposition IC can be:

$$I_n(x,y,z) = \Sigma_t f_n\{D(x,y,z;t) U(x,y,z;t)\}, \quad \text{(Equation 3)}$$

where $f_n(x,y,z;t)$ is a general function of space and time that operates on the product DU and decomposes it into n=1, 2, ..., N components. $I_n$ is the image formed from component n. If $f_n$ has the property that $$\Sigma_n f_n\{D(x,y,z;t) U(x,y,z;t)\} \approx D(x,y,z;t) U(x,y,z;t), \quad \text{(Equation 4)}$$

then $$\Sigma_n I_n(x,y,z) \approx I(x,y,z), \quad \text{(Equation 5)}$$

and the original image can, in some implementations, be approximately recovered by summing the component images.

One example of the new "time gate" IC uses $f_n(t) = W_n(t)$, where $W_n$ is a temporal window function for time gate n. In this case $$I_n(x,y,z) = \Sigma_t D(x,y,z;t) U(x,y,z;t) W_n(t). \quad \text{(Equation 6)}$$

The indices n=1, 2, ..., N specify N time gates. Define the length of each time gate to be 2T and let $t_n$ be the time at the center of time gate n. The $W_n(t)$ are nonzero for t in the range $[t_n-T, t_n+T]$. $W_n$ could resemble a boxcar, gaussian, cosine-squared or trapezoidal function, for example. $W_n$ also can overlaps its neighbors $W_{n-1}$ and $W_{n+1}$ so as to smooth the transition between time gated images $I_{n-1}$, $I_n$ and $I_{n+1}$. The data processing system can use other forms for $W_n$. The correlation and zero-lag of the crosscorrelation ICs output a 3-D image, but the new time gate IC outputs a 4-D image, with the extra dimension being the time gate index n. Summation over time gate should produce the complete image if the weight functions are designed appropriately. $W_n$ could also vary spatially if desired. In this case the window function would be $W_n(x,y,z;t)$.

The time gate IC may be used as is in RTM. It may be used in shot profile migration by inverse Fourier transforming the wavefields D and U from the frequency domain to the time domain at each depth level during imaging.

FIG. 1 illustrates a system to perform a seismic imaging in accordance with an implementation. The system 100 can include a data processing system 102. The data processing system 102 can include one or more processors, memory, logic arrays, or other components or functionality depicted in FIG. 7. The data processing system 102 can include or execute on one or more servers. The data processing system 102 can include one or more servers in a server farm, or distributed computing infrastructure, such as one or more servers forming a cloud computing infrastructure. The data processing system 102 can include at least one logic device such as a computing device 800 having one or more processors 810a-n.

The data processing system 102 can include, interface or otherwise communicate with at least one interface 104. The data processing system 102 can include, interface or otherwise communicate with at least one database 106. The data processing system 102 can include, interface or otherwise communicate with at least one image processor 108. The image processor 108 can include, interface with or otherwise communicate with at least one propagation component 110. The image processor 108 can include, interface with or otherwise communicate with at least one an gating component 112. The image processor 108 can include, interface with or otherwise communicate with at least one wavefield combination component 114. The image processor 108 can include, interface with or otherwise communicate with at least one inverse image generator component 116.

The interface 104, image processor 108, propagation component 110, gating component 112, wavefield combination component 114, or image generator component 116 can each include at least one processing unit or other logic device such as programmable logic array engine, or module configured to communicate with the database repository or database 106. The interface 104, database 106, image processor 108, propagation component 110, gating component 112, wavefield combination component 114, or image generator component 116 can be separate components, a single component, or part of the data processing system 102. The system 100 and its components, such as data processing system 102, can include hardware elements, such as one or more processors, logic devices, or circuits.

The data processing system 102 can communicate with one or more seismic data sources 120 or computing devices 122 via network 1018. The network 118 can include computer networks such as the Internet, local, wide, metro, or other area networks, intranets, satellite networks, and other communication networks such as voice or data mobile telephone networks. The network 118 can be used to access information resources such as seismic data, parameters, functions, thresholds, or other data that can be used to perform time gating or improve the processing of seismic data to generate images with reduced aliasing or noise that can be displayed or rendered via one or more computing devices 122, such as a laptop, desktop, tablet, digital assistant device, smart phone, or portable computers. For example, via the network 118 a user of the computing device 122 can access information or data provided by the data processing system 102. The computing device 122 can be located proximate to the data processing system 102, or be located remote from the data processing system 102. For example, the data processing system 102 or computing device 122 can be located on a vessel 5.

The data processing system 102 can include an interface 104 (or interface component) designed, configured, constructed, or operational to receive seismic data obtained via acoustic signals generated by at least one acoustic source and reflected from at least one subsurface lithologic formation. For example, an acoustic source device 85 depicted in FIG. 7 can generate an acoustic wave or signal that reflects from at least one subsurface lithologic formation beneath the seabed 55, and is sensed or detected by seismic sensor devices 30. The interface 104 can receive the seismic data via a wired or wireless communication, such as a direct wired link or through a wireless network or low energy wireless protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 110 can communicate with one or more components of the data processing system 102, network 118, or computing device 122.

The data processing system can receive the seismic data as ensembles of common-source or common-receiver data. The seismic data can include ensembles or sets of common-source or common-receive data.

The data processing system 102 can include an image processor 108 with propagation component 110 designed, constructed or operational to forward or backward propagate the seismic data. For example, the data processing system 102 can propagate the seismic data forward in time through a subsurface model to generate a first wavefield (e.g., a downgoing wavefield). The data processing system 102 can propagate the seismic data backward in time through the subsurface model to generate a second wavefield (e.g., an upgoing wavefield).

Figure 2:
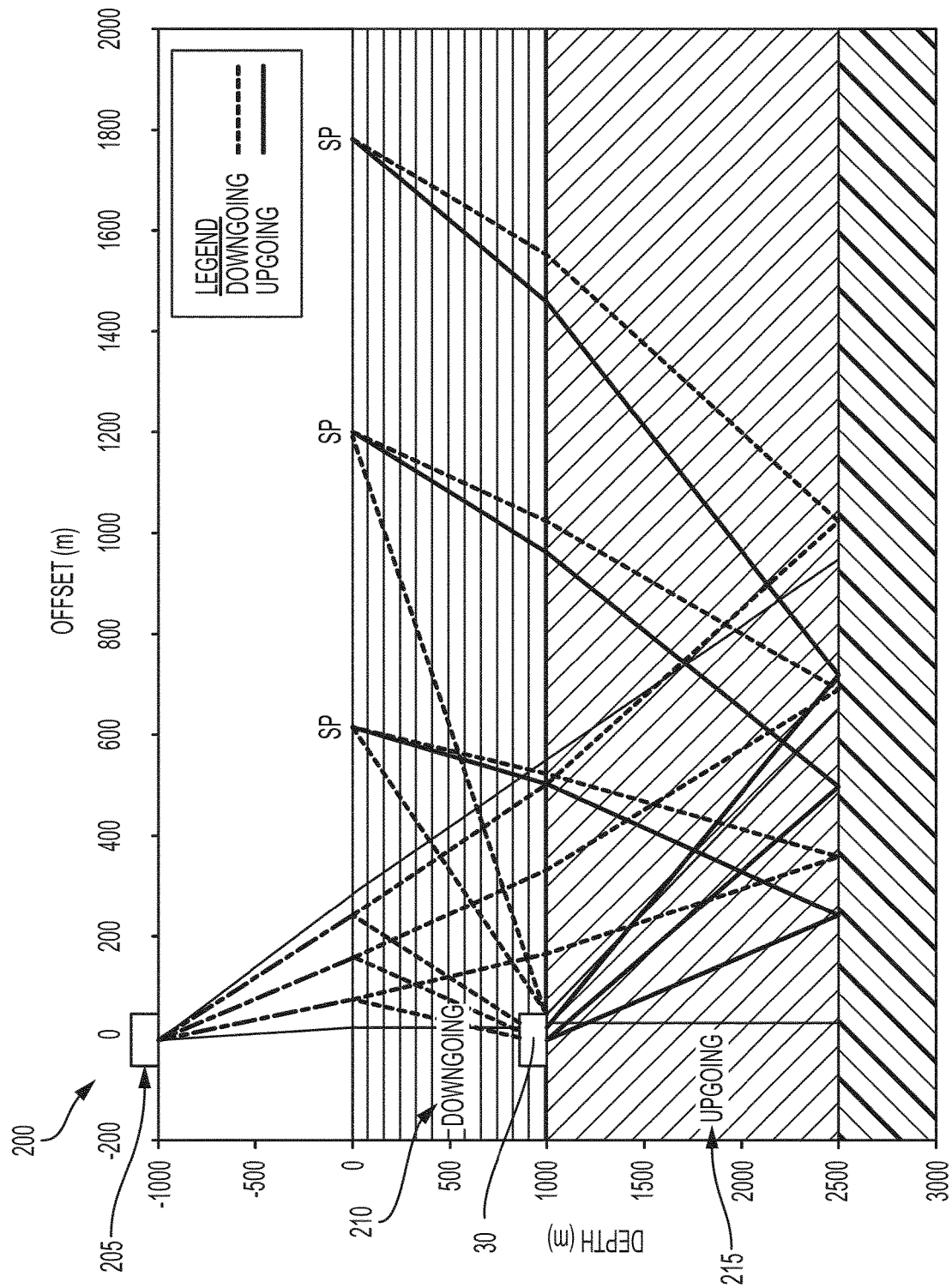
FIG. 2 depicts downgoing and upgoing waves in accordance with an embodiment.

For example, FIG. 2 shows an illustration 200 with multiple shot points (SP) 85 on the surface of the aqueous medium, which corresponds to a depth of 0 meters. The shot points 85 can be offset from the seismic device 30 by approximately 600 meters, 1200 meters, and 1800 meters. The data processing system 102 can select data corresponding to the shot point 85 at 600 meters for processing. A seismic data acquisition device 30 can be located on the seabed, for example at a depth of 1000 meters below the surface of the aqueous medium. Upgoing waves 215 refer to seismic energy that can arrive at the seafloor after being reflected off of a subsurface formation (e.g., a formation located at a depth of 2500 meters below the surface of the aqueous medium, or 1500 meters below the seafloor). The waves can refer to seismic energy from an acoustic signal propagated from one or more acoustic sources or shot points 85. A downgoing wave 210 can refer to seismic energy that arrives directly at the seafloor from the shot point 85, or seismic energy that arrives at the seafloor after a near-total (e.g., more than 90%, 80%, 70%, 60% or 50%) internal reflection at the air-water interface (e.g., the surface of the aqueous medium at a depth of 0 meters). The downgoing waves 210 can be projected to a point, such as point 205. The point 205 can indicate a focal point for a projection of the downgoing waves 210 when there is less than total reflection at the air-water interface.

The data processing system 102 can receive, generate or propagate the seismic data to obtain the first wavefield and the second wavefield. For example, the data processing system 102 may receive seismic data that includes the upgoing wavefield, and then use this data to generate the downgoing wavefield. The data processing system can receive seismic data comprising the first wavefield, and use the first wavefield to generate the second wavefield. The data processing system 102 can receive seismic data that includes the second wavefield, and then generate the first wavefield.

The downgoing wavefield can be represented as a function $D(x, y, z; \omega)$, and the upgoing wavefield can be represented as function $U(x, y, z; \omega)$, where x, y and z are position coordinates, and $\omega$ is temporal frequency. The upgoing and downgoing wavefield can be represented as functions in the time-domain as follows: $D(x, y, z; t)$, and $U(x, y, z; t)$.

The data processing system 102 can include an image processor 108 with a gating component 112 designed, constructed or operational to identify, generate or apply a gate or window or time gate imaging condition. The gate, window or time gating imaging condition can refer to a gating function or any other window function. For example, the gating function can be a function $f_n(x,y,z;t)$. The gating function can be applied to the product or combination of the downgoing and upgoing wavefield functions to decompose the product into components, such as n=1, 2, ..., N.

The time gate imaging condition can include a temporal window function for each of a plurality of time gates. The plurality of time gates can each have a predetermined length. The temporal window function can include at least one of a boxcar, Gaussian, cosine-squared or trapezoidal function. The time gate imaging condition can be configured to smooth across a plurality of time gates.

Other examples of the time gate can be $f_n(t)=W_n(t)$, where $W_n$ can be a temporal window function for the time gate n where $W_n(t)$ are nonzero for t in the range $[t_n-T, t_n+T]$. $W_n$ can represent a temporal window function for time gate n. Other window functions may be used for $W_n$, including, for example, a boxcar, gaussian, cosine-squared or trapezoidal function.

In some cases, the $f_n$ can represent a Matching Pursuit operator that decomposes the product DU into n components. Matching Pursuit can obtain a sparse representation of a time series in signal processing. Matching pursuit can refer to identifying the strongest event in time series, modeling it, and then subtracting this event. The matching pursuit process can include repeating this until all that is remaining is residual noise. The $f_n$ can be functions of time $f_n(t)$ or space and time $f_n(x,y,z;t)$. An example of spatial variation could be the operator $f_n$ changing with depth z. This can also include the $W_n$ for time gates.

The data processing system 102 can generate the gating function, or retrieve the gating function or values from database 106. The data processing system 102 can use a preselected gating function. The data processing system 102 can select a gating function to apply based on a policy, rule, or indication. For example, the data processing system 102 can use a policy that indicates which gating function to use based on the type of seismic data, amount of seismic data, desired output, or quality of the seismic data. The data processing system 102 can select the gating function to use based on an instruction from an end user. The data processing system 102 can select a gating function to use based on an amount computational resources available (e.g., type of computing device such as desktop computer or laptop computer or mobile computing device, processor utilization, or memory utilization). The data processing system 102 can select the gating function to use to maximize the image quality, reduce noise in the image, or reduce processor utilization or memory utilization.

The data processing system 102 can include an image processor 108 with a wavefield combination component 114 designed, constructed or operational to combine the first wavefield with the second wavefield using the time gate imaging condition to produce subsurface images and image gathers. For example, the data processing system can combine the first and second wavefield based on the following equation:

$$f_n\{D(x,y,z;t)U(x,y,z;t)\},$$

where $f_n(x,y,z;t)$ can be gating function in space and time that operates on the product DU and decomposes it into n=1, 2, ..., N components. The functions can be combined using a multiplication, dot product, convolution, addition, or other combination technique.

In another example, the wavefield combination component 114 can combine the wavefields using the gating function as follows:

$$D(x,y,z;t)U(x,y,z;t)W_n(t)$$

The data processing system 102 can include an image processor 108 with an image generator component 116 designed, constructed or operational to generate an image using the first and second wavefields and the time gating function as follows:

$$I_n(x,y,z)=\Sigma_t f_n\{D(x,y,z;t)U(x,y,z;t)\},$$

where $f_n(x,y,z;t)$ can be gating function in space and time that operates on the product DU and decomposes it into n=1, 2, ..., N components. $I_n$ can be the image formed from component n. This can be referred to as the temporal decomposition or image generated from the temporal decomposition.

Another example image can be generated using $f_n(t)=W_n(t)$, where $W_n$ is a temporal window function for time gate n, as follows:

$$I_n(x,y,z)=\Sigma_t D(x,y,z;t)U(x,y,z;t)W_n(t).$$

Here, the indices n=1, 2, ..., N specify N time gates. The length of each time gate can be 2T and $t_n$ can be the time at the center of time gate n. The $W_n(t)$ are nonzero for t in the range $[t_n-T, t_n+T]$. $W_n$ could resemble a boxcar, gaussian, cosine-squared or trapezoidal function, for example. $W_n$ also can overlaps its neighbors $W_{n-1}$ and $W_{n+1}$ so as to smooth the transition between time gated images $I_{n-1}$, $I_n$ and $I_{n+1}$.

The correlation and zero-lag of the crosscorrelation ICs output a 3-D image, but the new time gate IC outputs a 4-D image, with the extra dimension being the time gate index n. The data processing system can perform a summation over time gate to produce the complete image based on the weight functions. $W_n$ could also vary spatially if desired. In this case the window function would be $W_n(x,y,z;t)$.

For example, If $f_n$ has the property that $$\Sigma_n f_n\{D(x,y,z;t)U(x,y,z;t)\} \approx D(x,y,z;t)U(x,y,z;t),$$

then $$\Sigma_n I_n(x,y,z) \approx I(x,y,z),$$

and the original image can be approximately recovered by summing the component images.

The time gate IC may be used as is in RTM. It may be used in shot profile migration by inverse Fourier transforming the wavefields D and U from the frequency domain to the time domain at each depth level during imaging. The data processing system 102 can generate a 4-dimensional image from the combination of the first wavefield with the second wavefield using the time gate imaging condition.

In the temporal frequency domain, the image can be generated as follows:

$$I(x,y,z)=\Sigma_\omega D^*(x,y,z;\omega)U(x,y,z;\omega),$$

where I is the image, $\omega$ is temporal frequency, and the * represents complex conjugation. However, the correlation imaging condition without the time gating imaging condition may not facilitate mapping individual imaged events to the angle domain because it operates in the frequency domain.

Thus, images from the temporal decomposition IC using the time gating condition can be more efficient to generate (e.g., use significantly less computational resources) while providing more information to work with by decomposing seismic images $I(x,y,z)$ into components $I_n(x,y,z)$. In particular, the time gate IC produces n images generated from n time gate functions.

The data processing system 102 configured with the time gate IC method makes it possible to isolate and suppress certain types of undesirable noise events before summation over time gate to create $I(x,y,z)$. Undesirable noises include (a) imaging artifacts and (b) "crosstalk" generated by simultaneous imaging of primary and/or multiple reflections. For example, the data processing system can generate Kirchhoff migration images using the time gating function and using the imaging travel time. These time gated images may be separately processed for noise suppression before combining to make the complete image or image gathers.

The noise isolation and suppression may be performed on individually imaged common-source or common-receiver ensembles or it may be performed on images that represent the summation of several (or all) imaged common-source or common-receiver ensembles.

The primary and different orders of the multiple wavefields will image at different times for any specific image point. Therefore, the time gate IC has the potential to decompose or separate the images obtained from the primary and multiple wavefields.

The time gate IC allows efficient application of the Poynting vector method for creating angle gathers after migration of primary and/or multiple reflections. This applies to shot profile migration and RTM. Poynting vectors are generated in time gates and output in addition to the time gated images.

The data processing system 102 configured with the time gate IC allows for efficient creation of angle gathers during migration of primary and/or multiple reflections. This applies to shot profile migration and RTM. The time gate method allows a significant computational speedup over previous angle gathers approaches for RTM that map each time sample of the image separately to the angle domain.

When imaging multiple reflections (with or without primaries) more than one reflection event can image reflectors in the earth model. The correlation imaging condition without the time gating imaging condition does not facilitate mapping individual imaged events to the angle domain because it operates in the frequency domain. The time gate imaging condition can isolate multiple imaged events in time so that the events may be mapped individually to the angle domain. This applies to methods that create gathers after or during migration.

The time gate IC may be useful for imaging blended seismic data. Two or more seismic shots acquired simultaneously result in blended data. Blended data acquisition reduces the time and expense of seismic field operations. A field ensemble of blended shots can have multiple shot excitation times and at multiple illuminations from most subsurface reflectors. Due to the response from each shot arriving to image points at a different times and angles, these data may be imaged directly with shot profile or RTM by using a time gate IC so as to separate the multiple images of the reflectors.

The data processing system can generate Kirchhoff migration images using the time gating function and using the imaging travel time. These time gated images may be separately processed for noise suppression before combining to make the complete image or image gathers.

Figure 3:
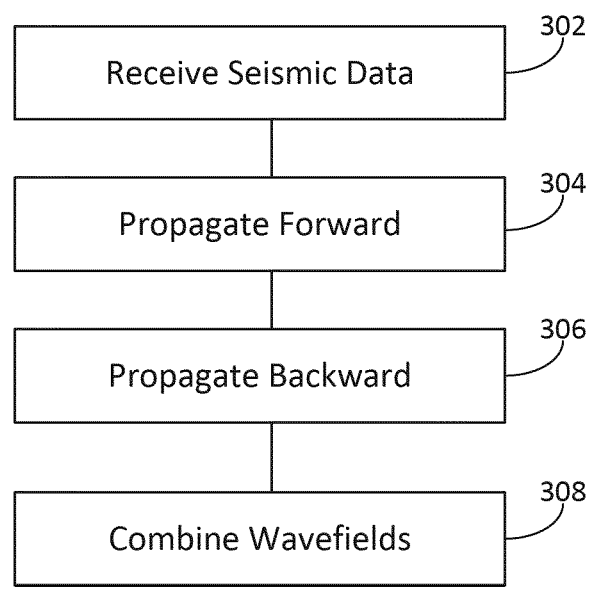
FIG. 3 depicts a method of performing seismic imaging, in accordance with an implementation.

FIG. 3 is a method of performing seismic imaging. The method 300 can be performed by one or more system or component depicted in FIG. 1 or FIG. 8. For example, a data processing system or image processor can perform one or more function or process of method 300. At ACT 302, the data processing system can receive seismic data. The seismic data can correspond to acoustic waveforms detected by an ocean bottom seismometer or other seismic data acquisition device. The seismic data can include ensembles of common-source or common-receiver data. In some embodiments, seismic data can relate to subsurface features, such as lithological formations or fluid layers that may indicate the presence of hydrocarbons, minerals or other elements. In some embodiments, seismic data can be received via acoustic signals generated by at least one acoustic source and reflected from at least one subsurface lithologic formation. In some embodiments, the receiving seismic data can include receiving seismic data from a vehicle, for example, an ROV or AUV. In some embodiments, receiving the seismic data can include receiving the seismic data via a wired or wireless communication, such as a direct wired link or through a wireless network or low energy wireless protocol.

At ACT 304, the data processing system can propagate the seismic data forward in time through a subsurface model to generate a first wavefield. The first wavefield can refer to a downgoing wavefield or "D" wavefield. The downgoing wavefield can be represented as a function $D(x, y, z; \omega)$ in the temporal frequency domain. The downgoing wavefield can be represented as a function $D(x, y, z; t)$, in the time domain. In some embodiments, the seismic data can be propagated from one or more acoustic sources or shot points 85. In some embodiments, the seismic data can be propagated forward in time through a subsurface model to generate a first wavefield after being propagated backward in time through a subsurface model to generate a second wavefield. In some embodiments, the seismic data can be propagated forward in time through a subsurface model to generate a first wavefield prior to being propagated backward in time through a subsurface model to generate a second wavefield.

At ACT 306, the data processing system can propagate the seismic data backward in time through the subsurface model to generate a second wavefield. The second wavefield can refer to an upgoing wavefield or "U" wavefield. The upgoing wavefield can be represented as a function $U(x, y, z; \omega)$ in the temporal frequency domain. The upgoing wavefield can be represented as a function $U(x, y, z; t)$, in the time domain. In some embodiments, the seismic data can be propagated from one or more acoustic sources or shot points 85. In some embodiments, the seismic data can be propagated forward in time through a subsurface model to generate a first wavefield prior to being propagated backward in time through a subsurface model to generate a second wavefield. In some embodiments, the seismic data can be propagated forward in time through a subsurface model to generate a first wavefield after being propagated backward in time through a subsurface model to generate a second wavefield.

At ACT 308, the data processing system can combine the first wavefield with the second wavefield using a time gate imaging condition to produce subsurface images and image gathers. The data processing system can select a time gating imaging condition based on a time gating function or temporal window. The data processing system can apply the time gating imaging condition to the product of the upgoing and downgoing wavefields. The data processing system can combine the two wavefields with an imaging condition (IC) in order to produce subsurface images and image gathers. The seismic images and gathers have many uses, including subsurface geological interpretation and iterative seismic velocity model development.

Figure 4:
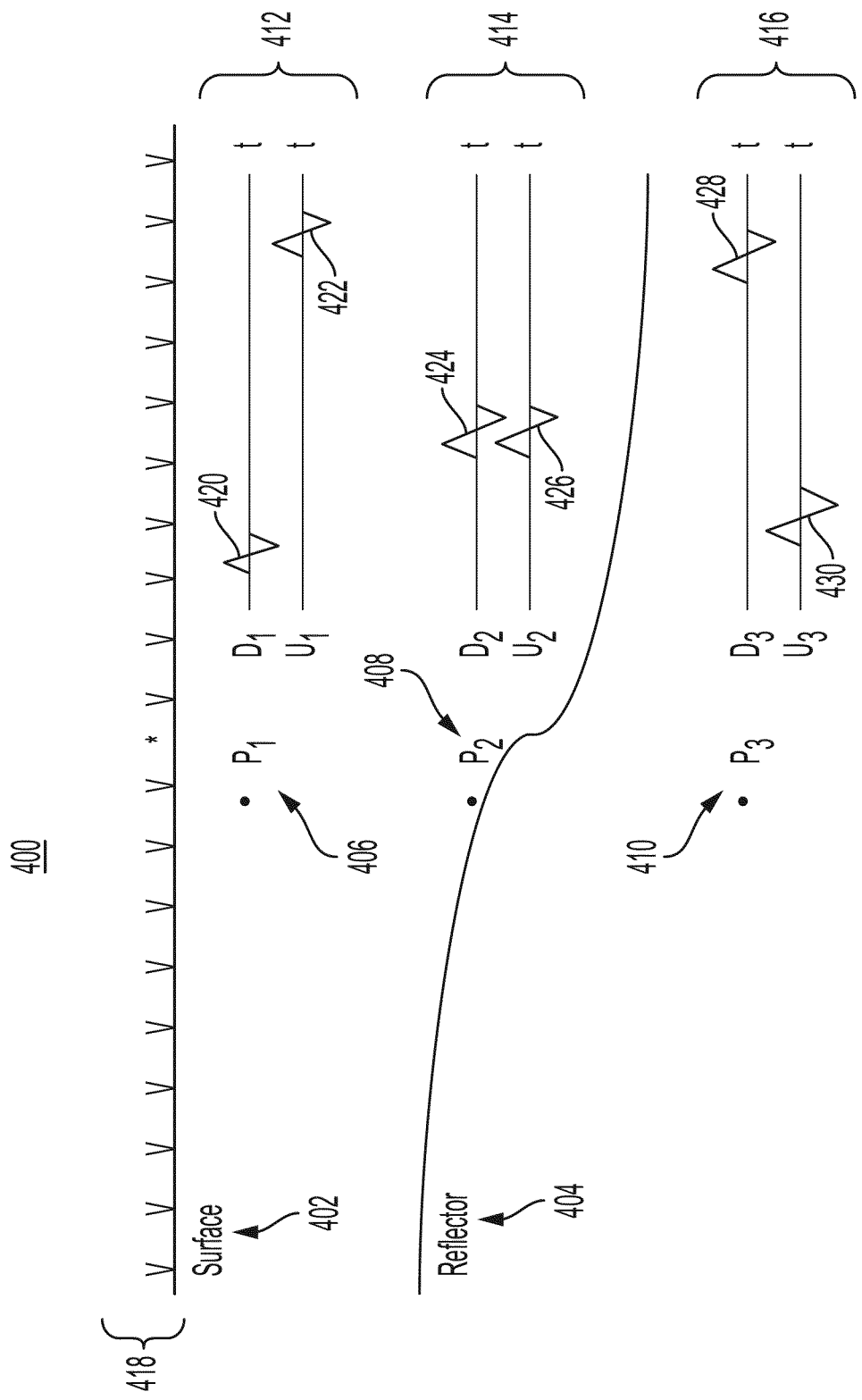
FIG. 4 is a diagram illustrating imaging of a primary reflection generated using the system depicted in FIG. 1 or the method depicted in FIG. 2, in accordance with an implementation.

FIG. 4 is a diagram illustrating imaging of a primary reflection generated using the system depicted in FIG. 1 or the method depicted in FIG. 2, in accordance with an implementation. The diagram 400 illustrates a surface 402 of the earth and a reflector 404 that can be below the surface 402 of the earth. The surface 402 can be an ocean bottom or seabed, or a land surface. The reflector 404 can be a subsurface lithologic formation, for example.

Diagram 400 depicts one reflector 404 and a seismic common-source ensemble 418 that used source and receivers on the Earth's surface. Time t is the wavefield recording time for propagation from source 418 to reflector 404, where reflection occurs, and propagation back to receivers 418. The initial downgoing wavefield $D_0$ at the Earth's surface (z=0) is an impulsive waveform positioned at t=0 at the source location. All other receiver locations for wavefield $D_0$ are zero. The initial upgoing wavefield $U_0$ at the Earth's surface (z=0) is the recorded common-source ensemble.

Point $P_1$ (406) is at $(x_1, y_1, z_1)$ above the reflector 404. The graph 412 depicts the wavefields at point $P_1$ (406). The wavefield $D_1$ is obtained by extrapolating the wavefield $D_0$ forward in time from the source location to location $P_1$. The waveform 420 on $D_1$ appears at the time consistent with propagation from the source position to the location $P_1$. The wavefield $U_1$ is obtained by extrapolating the wavefield $U_0$ backward in time to location $P_1$. The waveform 422 on $U_1$ appears at the time consistent with propagation from the source position to the reflector, where reflection occurs, and then propagation back up to location $P_1$. The image at $P_1$ may be zero since the events in $U_1$ and $D_1$ occur at different times.

Point $P_2$ (408) is at $(x_2,y_2,z_2)$ on the reflector 404. The graph 414 depicts the wavefields at point $P_1$ (408). The events 424 and 426 in $D_2$ and $U_2$, respectively, at $P_2$ are coincident in time, so the correlation IC will produce an image of the reflector at this location. The time gate IC will also produce an image, generally in only one time gate at this location.

Point $P_3$ (410) is at $(x_3,y_3,z_3)$ below the reflector. The graph 416 depicts the wavefields at point $P_1$ (410). The wavefields 428 and 430 at $P_3$ are analogous (and reversed) to those at $P_1$. The image at $P_3$ will also be zero since the events in $U_3$ and $D_3$ occur at different times.

Figure 5:
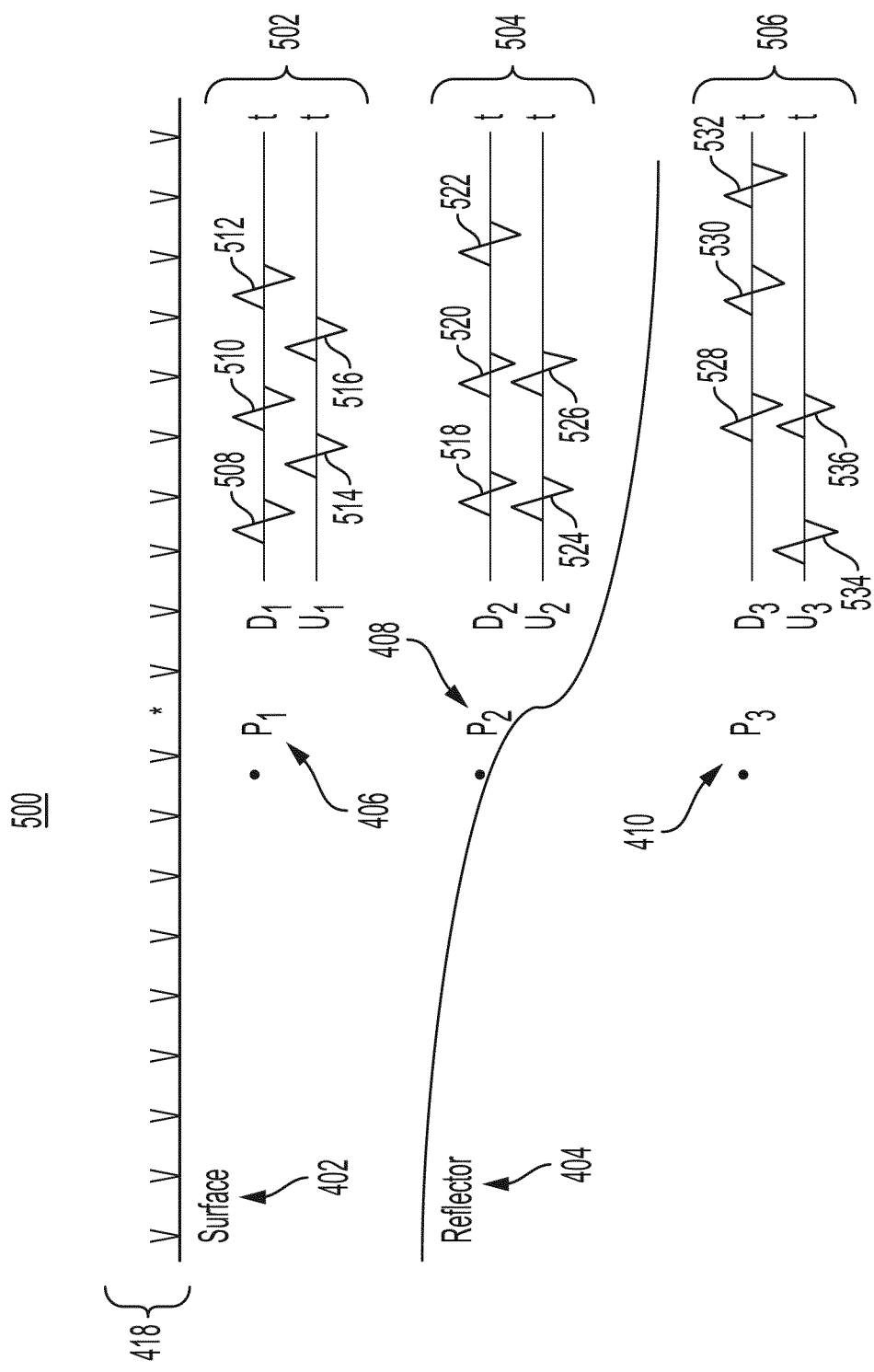
FIG. 5 is a diagram illustrating simultaneous imaging of a primary and a multiple reflection generated using the system depicted in FIG. 1 or the method depicted in FIG. 2, in accordance with an implementation.

FIG. 5 is a diagram illustrating simultaneous imaging of a primary and a multiple reflection generated using the system depicted in FIG. 1 or the method depicted in FIG. 2, in accordance with an implementation. FIG. 5 is different from FIG. 4 in that FIG. 5 shows that imaging multiples generally involves more complicated wavefields, especially the initial downgoing wavefield $D_0$. The graph 502 depicts the wavefields at point P1 (406). At P1 (406), the downgoing wavefield events 508, 510 and 512 are not coincident in time with the upgoing wavefield events 514 and 516, so the image at P1 may be zero.

However, the Primary reflection and a Multiple reflection in the upgoing wavefield do separately image the reflector at location $P_2$. The graph 504 depicts the wavefields at point P2 (408). For example, the downgoing wavefield events 518 and 520 can be coincident in time with the upgoing wavefield events 524 and 526. Both pairs of events in $D_2$ and $U_2$ (e.g., 518 and 524; and 520 and 526) can be coincident at different times as illustrated in the figure. The data processing system, using the correlation IC, can sum the images from both pairs of events into a single composite image. The data processing system can use the time gate IC to separate the images of these events so they may be analyzed after seismic imaging. At P3, the downgoing wavefields can be 528, 530 and 532; and the upgoing wavefield events can be 534 and 536. FIG. 5 shows that the event pair 528 and 536 can image below the reflector at $P_3$. The graph 506 depicts the wavefields at point P3 (410). This can be attributed to crosstalk noise that can contaminate a seismic image. The time gate IC may image these events also.

Figure 6:
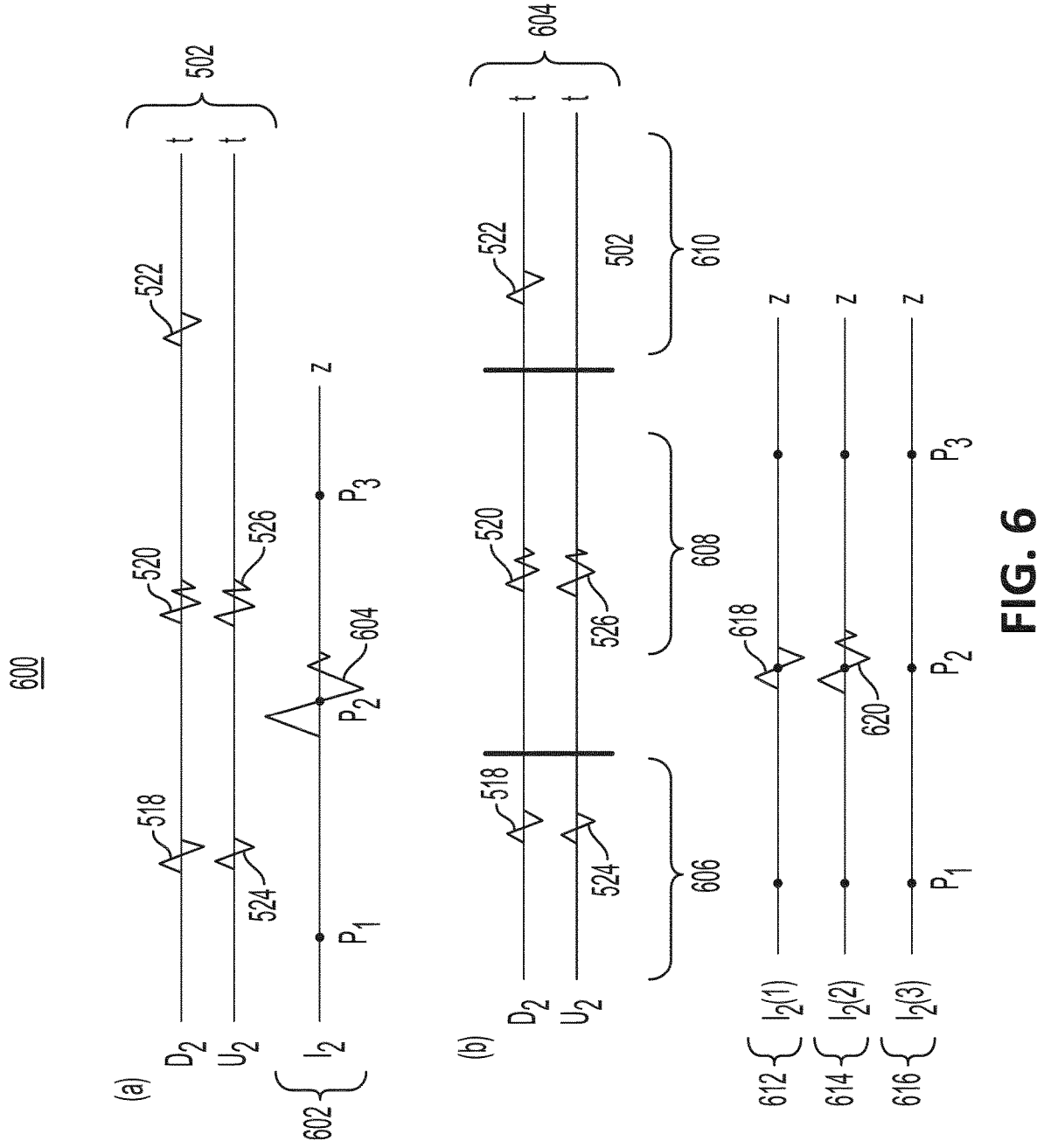
FIG. 6 is a diagram illustrating formation of the image trace at location P2 from FIG. 5 generated using the system depicted in FIG. 1 or the method depicted in FIG. 2, in accordance with an implementation.

FIG. 6 is a diagram illustrating formation of the image trace at location P2 from FIG. 5 generated using the system depicted in FIG. 1 or the method depicted in FIG. 2, in accordance with an implementation. FIG. 6 shows how the data processing system can form the image at location $P_2$ depicted in FIG. 5. Part (a) of diagram 600 shows the downgoing wavefields 518, 520 and 522 at location $P_2$, and the upgoing wavefields 524 and 526 at location $P_2$. The data processing system can use these two wavefields at location $P_2$ to generate the image trace 602 that would be created from the correlation IC assuming that points $P_1$, $P_2$, and $P_3$ are horizontally aligned. The image trace 602 illustrates an event 604 at location $P_2$. These points are labeled on the image traces at their correct depths in the figure. The second arrival in the wavefield traces has a different waveform than does the first arrival in this example. The image trace $I_2$ (602) is a function of depth and has an image 604 that is approximately the sum of the squares of the two aligned wavefield events (518 and 524; and 520 and 526). It is a mixture of the two images.

Part (b) (604) of diagram 600 is the analogous display of 502, but with the data processing system using the time gate IC with three time gates 606, 608, and 610. There are three image traces $I_2(n)$ (612, 614 and 616), one for each time gate (n=1,2,3). The first pair of events (518 and 524 in time gate 606) creates an image 618 that appears on $I_2(1)$ (612). The image 620 from the second pair of events (520 and 526 in time gate 608) appears on $I_2(2)$ (614). The data processing system retains, in each image, the wave shape and amplitude character of the pair of events used by the data processing system to create the image. This improves accuracy of subsequent AVO and amplitude analyses. This separation of images is also ideal for making angle gathers since each imaged event generally associates with different angles.

Events could straddle the time gate boundaries (e.g., a boundary between 606 and 608) shown in the figure causing imaging artifacts. Carefully designed overlapping time windows (function $W_n(t)$ in the Invention document) can be centered on each time gate to reduce imaging artifacts associated with time gate boundaries. Also, the number of time gates may be chosen to suit the imaging application.

Thus, by imaging each event in a separate time gate (e.g., time gates 606 and 608), the data processing system can use the time gate IC to separate noise from real reflector images after imaging. It also allows the data processing system to map each imaged event (e.g., 618 or 620) separately into the angle domain as the data processing system makes angle gathers either during or after seismic imaging. By handling each event separately, the data processing system configured with the time gate imaging method improved amplitude control for AVO analyses, while reducing computational resource usage.

Figure 7:
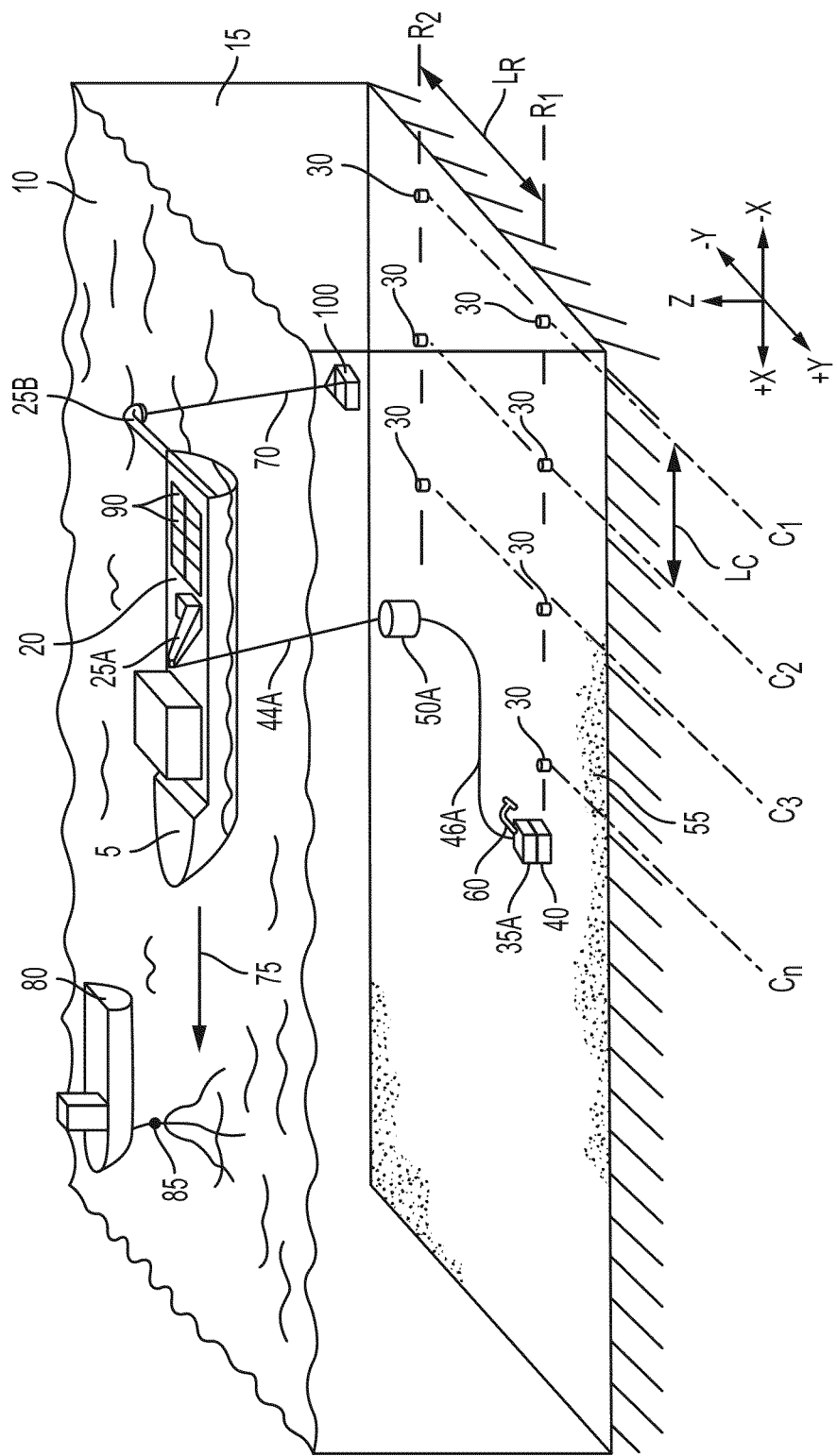
FIG. 7 depicts an isometric schematic view of an example of a seismic operation in deep water, in accordance with an implementation.

FIG. 7 is an isometric schematic view of an example of a seismic operation in deep water facilitated by a first marine vessel 5. FIG. 7 is a non-limiting illustrative example of a marine environment in which the systems and methods of the present disclosure can perform a seismic survey to collect seismic data and generate images.

By way of example, FIG. 7 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., first device 102) are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV (e.g., second device 104) or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 8:
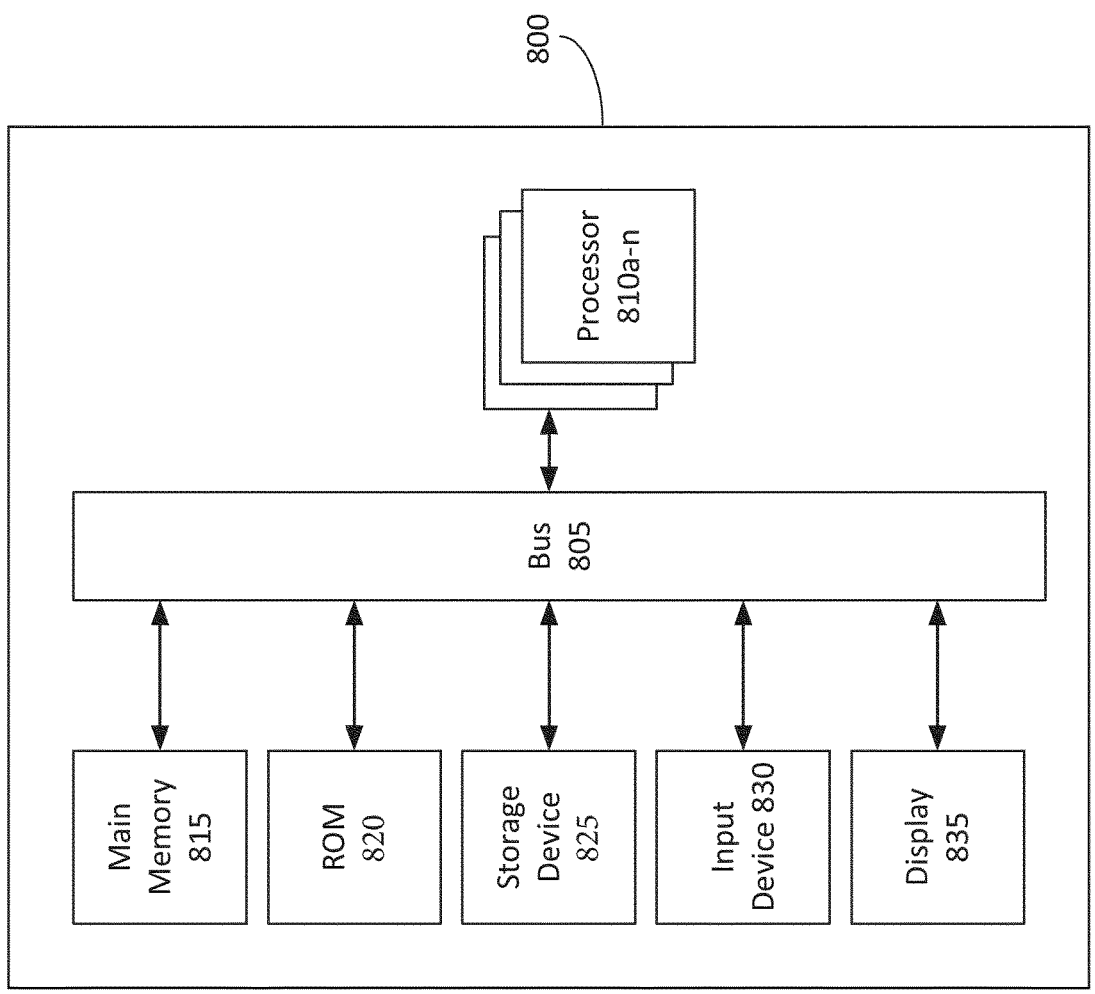
FIG. 8 depicts a block diagram of an architecture for a computing system employed to implement various elements of the system depicted in FIG. 1, to perform the method depicted in FIG. 3, or generate the images depicted in FIGS. 4-6, in accordance with an implementation.

FIG. 8 depicts a block diagram of an architecture for a computing system employed to implement various elements of the system depicted in FIG. 1, to perform the method depicted in FIG. 3, or generate the images depicted in FIGS. 4-6. FIG. 8 is a block diagram of a data processing system including a computer system 800 in accordance with an embodiment. The computer system can include or execute a coherency filter component. The data processing system, computer system or computing device 800 can be used to implement one or more component configured to filter, translate, transform, generate, analyze, or otherwise process the data or signals depicted in FIGS. 4-6. The computing system 800 includes a bus 805 or other communication component for communicating information and a processor 810$a$-$n$ or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. Main memory 815 can also be used for storing seismic data, time gating function data, temporal windows, images, reports, executable code, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835 or display device, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In some embodiments, hard-wired circuitry may be used in place of or in combination with software instructions to effect illustrative implementations. Thus, embodiments are not limited to any specific combination of hardware circuitry and software.

Although an example computing system has been described in FIG. 8, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and 'B'" can include only 'A', only 'B', as well as both 'A' and 'B'. Elements other than 'A' and 'B' can also be included.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to perform seismic imaging, comprising:
   a data processing system comprising a propagation component, gating component, and wavefield combination component, the data processing system to:
   receive seismic data comprising data ensembles of common-source or common-receiver data;
   propagate the seismic data forward in time through a subsurface model to generate a first wavefield;
   propagate the seismic data backward in time through the subsurface model to generate a second wavefield;
   combine the first wavefield with the second wavefield using a time gate imaging condition; and
   generate a 4-dimensional subsurface image from the combination of the first wavefield with the second wavefield using the time gate imaging condition;
   the time gate imaging condition to isolate a plurality of events in time such that the plurality of events are mapped individually to an angle domain such that the data processing system can separate noise from real reflector images.

2. The system of claim 1, wherein the time gate imaging condition comprises a temporal window function for each of a plurality of time gates.

3. The system of claim 2, wherein each of the plurality of time gates has a predetermined length.

4. The system of claim 2, wherein the temporal window function comprises at least one of a boxcar, Gaussian, cosine-squared or trapezoidal function.

5. The system of claim 1, wherein the time gate imaging condition is configured to smooth across a plurality of time gates.

6. The system of claim 1, comprising the data processing system to:
   generate a gating function from a database.

7. The system of claim 1, comprising the data processing system to:
   select a gating function based on a policy.

8. The system of claim 7, wherein the policy based on at least one of a type of seismic data, an amount of seismic data, a desired output or a quality of seismic data.

9. The system of claim 1, comprising the data processing system to:
   select a gating function based an amount of computational resources available.

10. The system of claim 1, comprising the data processing system to:
    select a gating function to reduce noise in the subsurface images.

11. A method of seismic imaging, comprising:
    receiving seismic data comprising data ensembles of common-source or common-receiver data;
    propagating the seismic data forward in time through a subsurface model to generate a first wavefield;
    propagating the seismic data backward in time through the subsurface model to generate a second wavefield;
    combining the first wavefield with the second wavefield using a time gate imaging condition to produce subsurface images and image gathers; and
    generating a 4-dimensional image from the combination of the first wavefield with the second wave field using the time gate imaging condition;
    the time gate imaging condition to isolate a plurality of events in time such that the plurality of events are mapped individually to an angle domain such that the data processing system can separate noise from real reflector images.

12. The method of claim 11, wherein the time gate imaging condition comprises a temporal window function for each of a plurality of time gates.

13. The method of claim 12, wherein each of the plurality of time gates has a predetermined length.

14. The method of claim 12, wherein the temporal window function comprises at least one of a boxcar, Gaussian, cosine-squared or trapezoidal function.

15. The method of claim 11, wherein the time gate imaging condition is configured to smooth across a plurality of time gates.

16. The method of claim 11, comprising:
    selecting a gating function based on a policy.

17. The method of claim 16, wherein the policy based on at least one of a type of seismic data, an amount of seismic data, a desired output or a quality of seismic data.

18. The method of claim 11, comprising:
    selecting a gating function based an amount of computational resources available.

* * * * *